US012806727B2

(12) United States Patent
Mitchell et al.

(10) Patent No.: US 12,806,727 B2
(45) Date of Patent: Nov. 24, 2026

(54) HEATED DYNAMIC SEAL ROTARY UNION FOR DELIVERY OF CRYOGENIC FLUID

(71) Applicant: Applied Materials, Inc., Santa Clara, CA (US)

(72) Inventors: Robert J. Mitchell, Winchester, MA (US); Guillermo Colom, Salisbury, MA (US)

(73) Assignee: Applied Materials, Inc., Santa Clara, CA (US)

( * ) Notice: Subject to any disclaimer, the term of this patent is extended or adjusted under 35 U.S.C. 154(b) by 411 days.

(21) Appl. No.: 18/538,730

(22) Filed: Dec. 13, 2023

(65) Prior Publication Data

US 2025/0196281 A1 Jun. 19, 2025

(51) Int. Cl.
*B23Q 11/10* (2006.01)
*H01R 13/00* (2006.01)

(52) U.S. Cl.
CPC .......... *B23Q 11/10* (2013.01); *H01R 13/005* (2013.01)

(58) Field of Classification Search
None
See application file for complete search history.

(56) References Cited

U.S. PATENT DOCUMENTS

| | | | | |
|---|---|---|---|---|
| 6,494,955 | B1 | 12/2002 | Lei et al. | |
| 9,377,048 | B2 | 6/2016 | Riaf | |
| 10,704,693 | B2 | 7/2020 | Mitchell et al. | |
| 10,971,327 | B1 * | 4/2021 | Mitchell | H01J 37/20 |
| 11,217,433 | B2 | 1/2022 | Mitchell et al. | |
| 2014/0360430 | A1 * | 12/2014 | Armour | C30B 25/12 118/728 |
| 2019/0301616 | A1 * | 10/2019 | Mitchell | F16J 15/43 |
| 2020/0111686 | A1 * | 4/2020 | Mitchell | H01J 37/32724 |
| 2020/0303223 | A1 | 9/2020 | Nakagawasai et al. | |
| 2025/0285835 | A1 | 9/2025 | Mitchell et al. | |

FOREIGN PATENT DOCUMENTS

| | | | | |
|---|---|---|---|---|
| JP | 2002-93894 | A | 3/2002 | |
| JP | 2006-179629 | A | 7/2006 | |
| KR | 10-2014-0081424 | A | 7/2014 | |
| TW | I755634 | B | 2/2022 | |
| WO | 2019/190661 | A1 | 10/2019 | |
| WO | WO-2025024071 | A1 * | 1/2025 | H10P 72/0434 |

OTHER PUBLICATIONS

Translation of WO-2025024071-A1 (Year: 2025).*
International Search Report and Written Opinion mailed Mar. 7, 2025 in corresponding PCT application No. PCT/US2024/056515.
Office Action mailed May 27, 2026 in co-pending U.S. Appl. No. 18/597,210.

* cited by examiner

*Primary Examiner* — Brian D Keller
*Assistant Examiner* — John Michael Larson
(74) *Attorney, Agent, or Firm* — Nields, Lemack & Frame, LLC

(57) ABSTRACT

A rotary union that includes one or more lip seals is disclosed. The rotary union includes a rotary union shaft and a rotary union housing that surrounds the rotary union shaft. Heaters are disposed on the outer surfaces of the rotary union shaft and the rotary union housing. Additionally, a low thermal conductivity path is created between the center portion of the rotary union housing, where the lip seals are located, and the base of the rotary union housing, which contacts the cryogenic fluid. This low thermal conductivity path allows the lip seals to remain sufficiently warm so as to ensure good seal performance and reduced leakage.

17 Claims, 3 Drawing Sheets

HEATED DYNAMIC SEAL ROTARY UNION FOR DELIVERY OF CRYOGENIC FLUID

FIELD

Embodiments of the present disclosure relate to rotary unions for delivery of cryogenic fluids, and more particularly, to rotary unions including a heated lip seal.

BACKGROUND

In some workpiece processing systems, the workpiece is disposed on a platen, which can be rotated. This platen may also include electrical components, such as electrodes that are in communication with a power source. Additionally, this platen may have fluid conduits to allow a fluid to pass therethrough to heat or cool the platen. These fluid conduits are in communication with an external fluid source and an external fluid sink. Because the platen rotates, a rotary union is typically used to link the platen to the external components. The rotary union provides the electrical connections, as well as fluid inlets and fluid outlets. In some embodiments, the electrical connections may be integrated, while in other embodiments, a separate electrical rotary union may be employed. Further, typically, one end of the rotary union is disposed in a process chamber, which is maintained at very low pressure, while the other side is disposed at atmospheric conditions.

The workpiece may be a semiconductor wafer, which is subjected to one or more processes while disposed on the platen. These processes may include etching, deposition and ion implantation.

In some particular embodiments, the platen is cooled to cold temperatures to enhance the process being performed on the workpiece. This may be achieved by passing a cold fluid through the fluid conduits in the platen. However, seals used in conventional rotary unions often fail to seal at cryogenic temperatures. For example, leakage may result from a shrinkage of the seal due to temperature changes, from the seal becoming brittle or less compliant due to the low temperatures, or due to other reasons.

Consequently, it would be beneficial if there was a rotary union that could withstand these extremely low temperatures without failing. Such a rotary union would make it possible to perform cryogenic processing of the workpiece using a rotating platen.

SUMMARY

A rotary union that includes one or more heated lip seals is disclosed. The rotary union includes a rotary union shaft and a rotary union housing that surrounds the rotary union shaft. Heaters are disposed on the outer surfaces of the rotary union shaft and the rotary union housing. Additionally, a low thermal conductivity path is created between the center portion of the rotary union housing, where the lip seals are located, and the base of the rotary union housing, which contacts the cryogenic fluid. This low thermal conductivity path allows the lip seals to remain sufficiently warm so as to ensure good seal performance and reduced leakage.

According to one embodiment, a rotary union for carrying cryogenic fluid is disclosed. The rotary union comprises an inner shaft, wherein the inner shaft is configured to deliver the cryogenic fluid to a platen; a rotary union shaft surrounding the inner shaft, having an inner surface of the rotary union shaft separated from the inner shaft by a gap configured to carry the cryogenic fluid away from the platen; a rotary union housing surrounding the rotary union shaft; a housing heater disposed on the rotary union housing; and one or more lip seals disposed between an outer surface of the rotary union shaft and an inner surface of a center portion of the rotary union housing; wherein the center portion of the rotary union housing is attached to a base of the rotary union housing by a lower portion, and wherein the lower portion comprises a tortuous pathway so as to increase a length of a path from the base to the center portion. In some embodiments, a shaft heater is disposed on an outer surface of the rotary union shaft. In some embodiments, the lower portion of the rotary union housing comprises a low thermal conductivity pathway having a thermal resistance of 10° K/Watt or greater. In some embodiments, the rotary union housing comprises an upper portion, the center portion and the lower portion and wherein the housing heater is disposed on the upper portion of the rotary union housing. In some embodiments, a thermal conductivity of a pathway from the housing heater to the center portion is at least 5 times greater than a thermal conductivity of the tortuous pathway. In some embodiments, channels are formed in the rotary union shaft, such that the outer surface of the rotary union shaft where the one or more lip seals are disposed is warmer than a temperature of the inner surface of the rotary union shaft. In certain embodiments, the outer surface of the rotary union shaft is at least 100° C. warmer than the temperature of the inner surface. In some embodiments, an inlet and an outlet for the cryogenic fluid are disposed in the base of the rotary union housing.

According to another embodiment, a workpiece processing system is disclosed. The workpiece processing system comprises a process chamber housing a platen and any of the rotary unions described above, coupled to the platen.

According to another embodiment, a rotary union for carrying cryogenic fluid is disclosed. The rotary union comprises an inner shaft, wherein the inner shaft is configured to deliver the cryogenic fluid to a platen; a rotary union shaft surrounding the inner shaft, an inner surface of the rotary union shaft separated from the inner shaft by a gap configured to carry the cryogenic fluid away from the platen; a rotary union housing surrounding the rotary union shaft, the rotary union housing comprising an upper portion, a center portion, a lower portion and a base; a housing heater disposed on an outer surface of the upper portion one or more lip seals disposed of the rotary union housing; and between the outer surface of the rotary union shaft and an inner surface of the center portion of the rotary union housing; wherein an inlet and an outlet for the cryogenic fluid is disposed in the base; and a ratio of a thermal conductivity of a path from the housing heater to the center portion of the rotary union housing to a thermal conductivity of a path from the base to the center portion of the rotary union housing is at least 5. In some embodiments, the ratio is at least 10. In some embodiments, the lower portion of the rotary union housing comprises a tortuous pathway so as to increase a length of the path from the base to the center portion. In certain embodiments, the outer surface of the rotary union shaft where the one or more lip seals are disposed is at least 100° C. warmer than a temperature of the base. In some embodiments, a shaft heater is disposed on an outer surface of the rotary union shaft. In some embodiments, channels are formed in the rotary union shaft, such that the outer surface of the rotary union shaft where the one or more lip seals are disposed is warmer than a temperature of the inner surface of the rotary union shaft.

According to another embodiment, a workpiece processing system is disclosed. The workpiece processing system comprises a process chamber housing a platen; and a rotary union coupled to the platen, the rotary union comprising: an inner shaft, wherein the inner shaft is configured to deliver the cryogenic fluid to a platen; a rotary union shaft surrounding the inner shaft, an inner surface of the rotary union shaft separated from the inner shaft by a gap configured to carry the cryogenic fluid away from the platen; a rotary union housing surrounding the rotary union shaft, the rotary union housing comprising an upper portion, a center portion, a lower portion and a base; a housing heater disposed on an outer surface of the upper portion of the rotary union housing; and one or more lip seals disposed between the outer surface of the rotary union shaft and an inner surface of the center portion of the rotary union housing; wherein an inlet and an outlet for the cryogenic fluid is disposed in the base; wherein the center portion of the rotary union housing is attached to the base of the rotary union housing by the lower portion; and wherein the lower portion comprises a tortuous pathway so as to increase a length of a path from the base to the center portion. In some embodiments, a shaft heater disposed on an outer surface of the rotary union shaft. In some embodiments, channels are formed in the rotary union shaft, such that the outer surface of the rotary union shaft where the one or more lip seals are disposed is warmer than a temperature of the inner surface of the rotary union shaft.

BRIEF DESCRIPTION OF THE FIGURES

For a better understanding of the present disclosure, reference is made to the accompanying drawings, which are incorporated herein by reference and in which.

DETAILED DESCRIPTION

As described above, in certain systems, it is desirable to have a workpiece processed at very low temperatures, while disposed on a rotating platen. Further, mechanical seals are prone to leakage due to the low temperatures.

Figure 1:
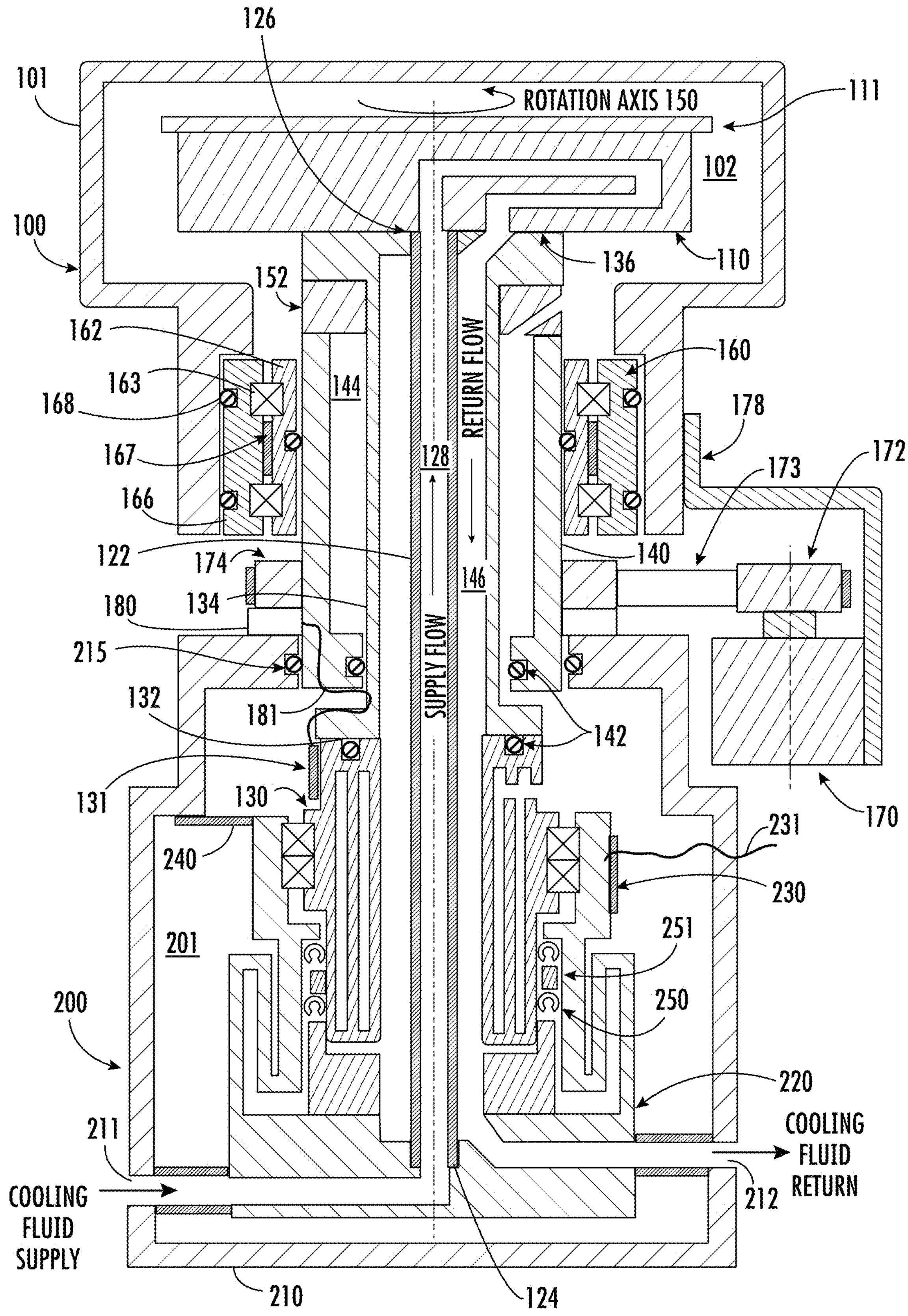
FIG. 1 is a view of a workpiece processing system that utilizes the cryogenic rotary union with heated lip seals according to one embodiment.

FIG. 1 shows a system that addresses this issue. As shown, the system includes a process chamber 100 that houses a platen 110, wherein the platen 110 is used to support a workpiece 111. The workpiece 111 may be a semiconductor wafer, such as a silicon wafer, silicon carbide wafer or other material. The process chamber 100 comprises a plurality of walls 101 that define a sealed volume 102, which is maintained at near vacuum conditions. In this disclosure, the term "near vacuum conditions" refers to a pressure of less than 50 millitorr. In some embodiments, an ion source may also be in communication with the process chamber 100. In other embodiments, one or more components may be disposed between the ion source and the process chamber 100. The type of processing defines the configuration. In one particular embodiment, the process is PVD (Physical Vapor Deposition). In this embodiment, gases are introduced into the process chamber 100 to form a film on the workpiece 111. In another embodiment, the workpiece 111 may be subjected to an ion implantation where either a beamline system or a plasma source is in communication with the process chamber 100. For example, a beam-line ion implantation system may have a mass analyzer, one or more acceleration/deceleration stages and a collimator disposed between the ion source and the process chamber 100. In another embodiment, the workpiece 111 may be subjected to an etch process. In an etch process, a source of RF energy is typically placed above the workpiece 111 and the platen 110 may be electrically biased. Thus, the location of the ion source or plasma source relative to the process chamber 100 is not limited by this disclosure.

As shown, the system may include an inner shaft 122 having a first end 124 opposite a second end 126, wherein the second end 126 is coupled to the platen 110. In certain embodiments, the inner shaft 122 is rotatable and includes an internal channel 128 used to deliver a cryogenic fluid to the platen 110. In other embodiments, the inner shaft 122 may be stationary and a bushing may be disposed between the inner shaft 122 and the platen 110. The system may further include a rotary union shaft 130 surrounding the inner shaft 122, wherein the rotary union shaft 130 is directly coupled to a first end 132 of an intermediate tube 134. The intermediate tube 134 surrounds the inner shaft 122, and includes a second end 136 fixedly coupled to the platen 110. As such, the intermediate tube 134 and the platen 110 may rotate together. In some embodiments, the rotary union shaft 130 and the intermediate tube 134 may be a unitary component.

The system may further include an outer shaft 140 surrounding the intermediate tube 134. The outer shaft 140 may form a static seal 142 with an exterior of the intermediate tube 134 to isolate chamber the process environment from the vacuum isolation environment 201 within the isolation box 200. A channel 144 may separate the outer shaft 140 from the intermediate tube 134. A return channel 146 may separate the intermediate tube 134 and the rotary union shaft 130 from the inner shaft 122. The cryogenic fluid travels through the internal channel 128 to the platen 110 and then returns via the return channel 146. The intermediate tube 134 and the outer shaft 140 may be referred to as a rotating shaft assembly, as all of these components rotate about an axis 150. In some embodiments, the inner shaft 122, the intermediate tube 134 and the outer shaft 140 may be Concentrically arranged. Furthermore, in certain embodiments, the inner shaft 122, the intermediate tube 134, and the outer shaft 140 may each be made from stainless steel.

An outer shaft support 152 may be disposed between the outer shaft 140 and the intermediate tube 134 near the upper end of the outer shaft 140. The outer shaft support 152 may mechanically support the platen 110 relative to outer shaft 140 and help maintain the channel 144. Further, the outer shaft support 152 may be thermally insulating to minimize the transfer of heat between the intermediate tube 134 and the outer shaft 140. Additionally, the outer shaft support 152 may have openings so the channel 144 is part of the atmosphere of the process chamber 100. In this way, the channel 144 may also be maintained at near vacuum conditions.

The process chamber 100 may also include a rotary ferrofluid seal 160 isolating the process chamber 100 from the atmosphere. The rotary ferrofluid seal 160 includes an inner shaft 162 and an outer shaft 166 supported by bearings 163. The exterior surface of the outer shaft 140 is supported by the inner shaft 162 of the rotary ferrofluid seal 160. Static seals 168 serve to decrease potential leaks between the process chamber 100 and the atmosphere. The ferrofluid 167 is disposed between the bearings 163. In certain embodiments, the ferrofluid 167 and bearings 163 may operate at temperatures greater than about −40° C.

The rotating shaft assembly may be rotated using any suitable means. For example, the rotating shaft assembly may be moved by connection to a drive timing belt 173, a motor pulley 172 and a driven pulley 174 in communication with a motor 170. A bracket 178 may be used to secure the motor 170 to the walls 101 of the process chamber 100. In other embodiments, the rotating shaft assembly may be directly driven. For example, direct drive where the motor's magnetic field drives the rotating shaft assembly and the rotor could also be used. Thus, the mechanism used to cause the rotation of the rotating shaft assembly is not limited by this disclosure.

The rotating shaft assembly terminates in an isolation box 200. The isolation box 200 includes a housing 210 having the inlet 211 and the outlet 212 for the cryogenic fluid. The cryogenic fluid may be a gas or liquid. The internal channel 128 of the inner shaft 122 is in fluid communication with the inlet 211, while the return channel 146 is in fluid communication with the outlet 212.

The isolation box 200 surrounds the rotary union shaft 130, and includes a dynamic rotary seal 215 to isolate a vacuum isolation environment 201 within the isolation box 200 from the atmospheric pressure outside the isolation box 200. The dynamic rotary seal 215 may be a spring loaded Teflon seal, O-rings, or any other suitable sealing means. In some embodiments, the isolation box 200 may be kept at sub-atmospheric pressures, such as in the millitorr range. In certain embodiments, the pressure within the isolation box 200 may be 50 millitorr or less. The interior of the isolation box 200 may be continually pumped to sustain the vacuum levels low enough to minimize heat transfer from the rotary union to the walls of the isolation box 200 using a vacuum pump (not shown).

The rotary union housing 220 is disposed within the isolation box 200, and surrounds the rotary union shaft 130, A shaft heater 131 is mounted on the rotary union shaft 130. An electrical slip ring assembly 180 may be disposed on the outer shaft 140. The electrical slip ring assembly 180 may comprise one or more slip rings that allow electrical connection between a stationary object and a rotating object, such as between the external atmosphere and the shaft heater 131. The number of slip rings is not limited by this disclosure. The electrical slip ring assembly 180 allows electrical wires 181 to be connected to the shaft heater 131.

A housing heater 230 is mounted on the rotary union housing 220. The electrical wires 231 pass through the isolation box 200 to the external environment. Since the rotary union housing 220 is fixed, a slip ring is not used. Additionally, a bracket 240 may be used to inhibit the rotation of the rotary union housing 220 by affixing the rotary union housing 220 to the isolation box 200.

Lastly, lip seals 250 are used to seal the gap between the rotary union housing 220 and the rotary union shaft 130, A seal spacer 251 may be disposed in the gap to maintain the separation between these components.

Figure 2:
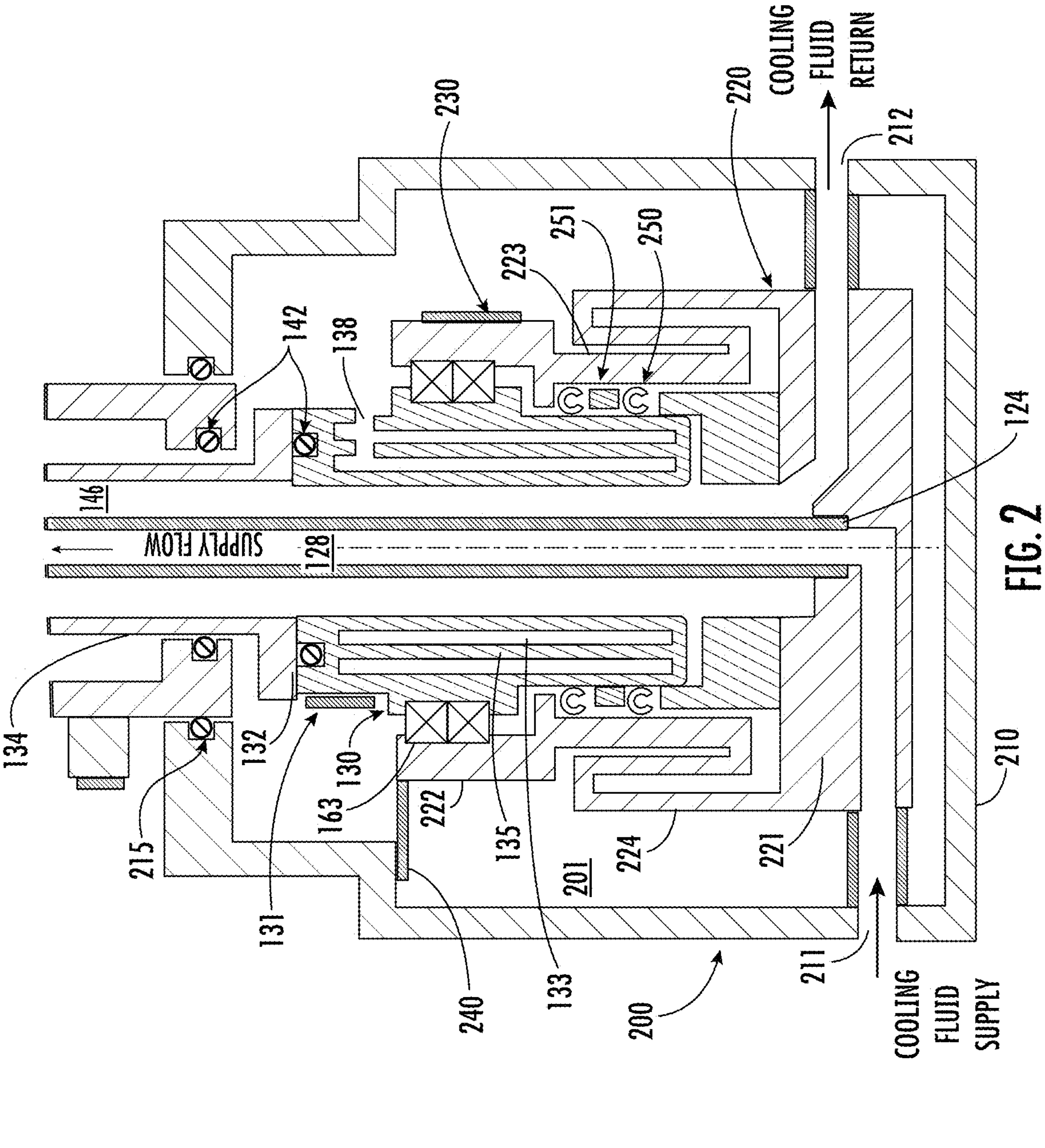
FIG. 2 shows an enlarged view of the isolation box and the components disposed therein.

FIG. 2 shows an enlarged view of the isolation box 200 and the components disposed therein. The rotary union shaft 130 forms part of the outer wall of the return channel 146. Consequently, the inner surface of the rotary union shaft 130 is subjected to very low temperatures, such as less than −40° C. To generate the desired heat gradient between the inner surface of the rotary union shaft 130 and the outer surface of the rotary union shaft 130, one or more channels 133 are disposed in the rotary union shaft 130. One or more openings 138 are used to allow the one or more channels communication with the vacuum isolation 133 to be in environment 201 within the isolation box 200. Note that the one or more channels 133 are separated from one another by thin partitions 135. These thin partitions 135 serve to reduce heat transfer between the inner surface and the outer surface of the rotary union shaft 130. Thus, the rotary union shaft 130 may be configured as a hollow cylinder, wherein one or more channels 133 are disposed in the cylinder. Further, as noted above, static seals 142 are used to seal the rotary union shaft 130 to the intermediate tube 134. The rotary union shaft 130 rotates with the intermediate tube 134 and the platen 110.

The shaft heater 131 may be disposed on the outer surface of the rotary union shaft 130 near the intermediate tube 134. This location may be selected as it is distant from the base 221 of the rotary union housing 220, which is at very low temperatures due to its contact with the cryogenic fluid.

The rotary union housing 220 comprises a base 221, which is in communication with the inlet 211 and the outlet 212 to allow the flow of cryogenic fluid. The rotary union housing 220 also Comprises a top portion 222. The top portion 222 is that portion of the rotary union housing 220 that is closest to the top of the isolation box 200, and therefore closest to the platen 110. Top portion 222 may be shaped as a hollow cylinder. The housing heater 230 is affixed to the outer surface of the top portion 222 of the rotary union housing 220. Over a least a part of its length, the inner surface of the top portion 222 may be concentric to the outer surface of the rotary union shaft 130. Further, bearings 163 are disposed between the inner surface of the top portion 222 and the outer surface of the rotary union shaft 130. Bearing retaining flanges may be disposed on either the inner surface of the top portion 222 or the outer surface of the rotary union shaft 130 so as to retain the bearings 163 in position.

The top portion 222 leads to the center portion 223 of the rotary union housing 220. Like the top portion, the center portion 223 may be shaped as a hollow cylinder, Over a least a part of its length, the inner surface of the center portion 223 may be concentric to the outer surface of the rotary union shaft 130. One or more lip seals 250 are disposed in the gap between the inner surface of the center portion 223 and the outer surface of the rotary union shaft 130. The seal spacer 251 is also located in the gap between the inner surface of the center portion 223 and the outer surface of the rotary union shaft 130 and serves to maintain the desired spacing of the gap between the inner surface of the center portion 223 and the outer surface of the rotary union shaft 130. The seal spacer 251 may be PERK (poly ether ether ketone) although other low friction plastics capable of operation at cryogenic temperatures may be used. Since the housing heater 230 is disposed on the top portion 222 and the one or more lip seals 250 are located near the center portion 223, there is a high thermal conductivity path between the top portion 222 and the center portion 223.

The center portion 223 of the rotary union housing 220 attaches to the base 221 through a lower portion 224 which forms a low thermal conductivity path, resulting from a small cross sectional area and long distance from the base 221 to the seal area. As used herein, the term "low thermal conductivity path" refers to a path having a thermal resistance that is 10° K/Watt or greater. In some embodiments, the thermal resistance may be 15° K/Watt or greater. In some embodiments, the thermal resistance may be 20° K/Watt or greater. In other embodiments, the thermal resistance may be 30° K/Watt or greater. Specifically, the lower portion 224 is a low thermal conductivity pathway between the base 221, which is at very cold temperatures, and the center portion 223, which is in contact with the one or more lip seals 250.

As is well known, the rate of heat transfer is directly proportional to the cross-section area of the pathway and inversely proportional to the length of that pathway. Thus, to achieve a low thermal conductivity pathway, the cross-sectional area of the lower portion 224 may be reduced, as compared to the cross-sectional area of the center portion 223 and the top portion 222. In some embodiments, the cross-sectional area of the lower portion 224 may be one half or less than one half of the cross-sectional area of the center portion 223. In certain embodiments, the cross-sectional area of the lower portion 224 may be ¼ of the cross-sectional area of the center portion 223 or less. Additionally, the length of the lower portion 224 may be increased. This may be achieved by disposing the base 221 far from the center portion 223. However, this results in a large isolation box 200. Alternatively, the lower portion 224 may comprise a tortuous pathway, comprising one or more folds so as to extend the path between the base 221 and the center portion 223. As shown in FIG. 1, in some embodiments, the lower portion 224 may be a plurality of segments that extend in the axial direction, where the folds reverse the direction of the path. However, other embodiments are also possible. For example, the lower portion 224 may have a plurality of segments that extend radially outward and inward, where the folds reverse the direction of the path. Further, the plurality of segments may extend diagonally, such that there is a radial and axial component. In certain embodiments, the thermal conductivity of the lower portion 224 is at least 10 times less than the thermal conductivity of the top portion 222 or the center portion 223. In some embodiments, the ratio of the thermal conductivity of the path from the top portion 222 to the center portion 223 to the thermal conductivity of the path from the base 221 to the center portion 223 may be 5 or greater. In certain embodiments, the ratio may be 10 or greater. In some example embodiments, the ratio may be between 10 and 20. Further, while the figures show two folds, it is understood that additional folds may be introduced.

Figure 3:
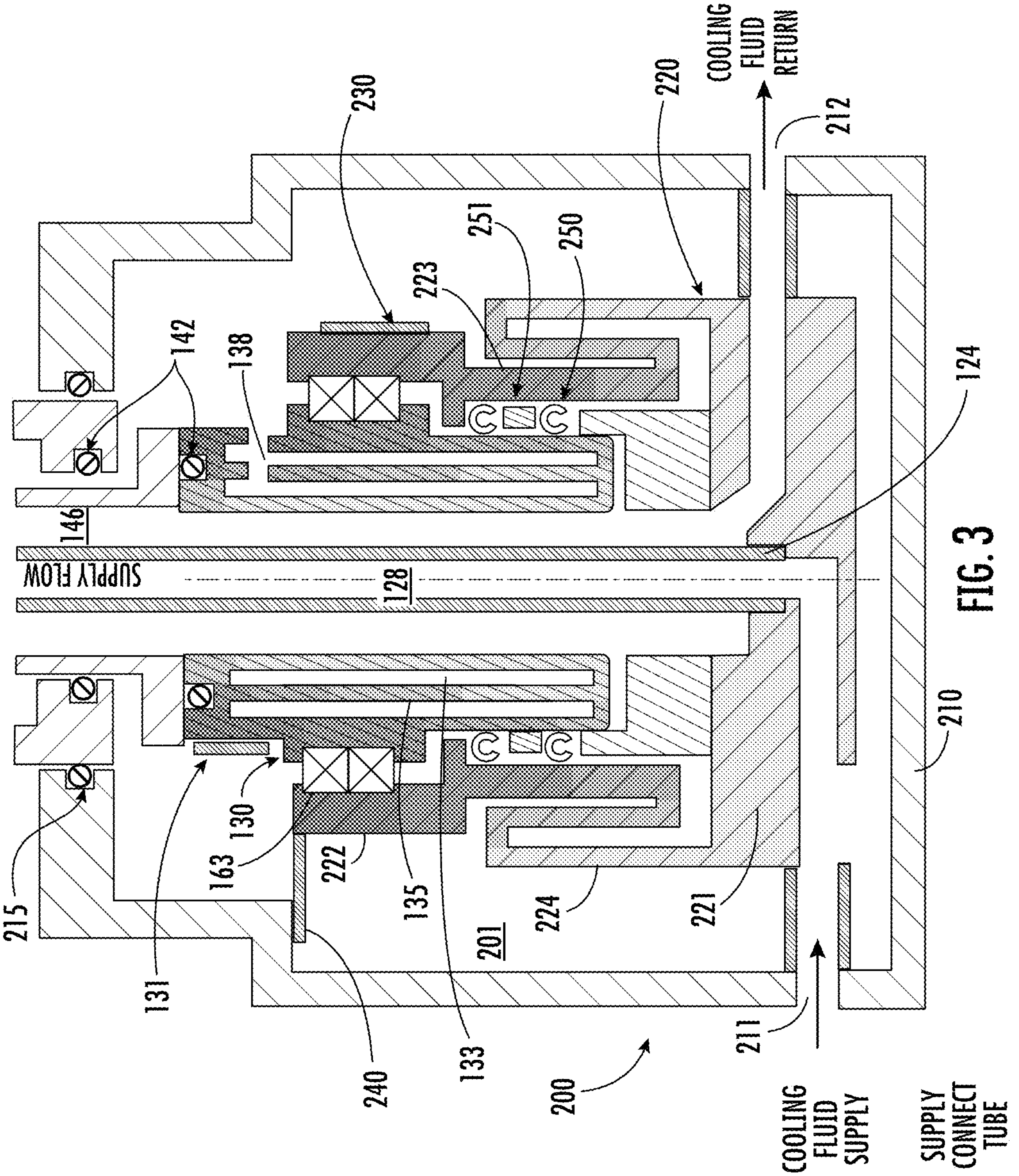
FIG. 3 shows the thermal profile of the components shown in FIG. 2.

FIG. 3 shows the effects of the different thermal conductivities. In this figure, the shaft heater 131 and the housing heater 230 are both enabled and serve to heat the rotary union shaft 130 and the top portion 222 of the rotary union housing 220, respectively. Additionally, cryogenic fluid is passing through the internal channel 128 and exiting through the return channel 146, which serves to cool the base 221 and the inner surface of the rotary union shaft 130. The darkest shading is used to indicate the warmest components, while the lighter shading indicates components. The shading between these two extremes indicates an intermediate temperature.

Referring first to the rotary union shaft 130, the inner surface of that shaft is cold, due to its contact with the return channel 146 carrying cryogenic fluid. However, the channels 133 and thin partitions 135 create a low thermal conductivity pathway in the radial direction between the inner surface and the outer surface. Additionally, the shaft heater 131 is disposed on the outer surface of the rotary union shaft 130. Thus, a large thermal gradient is created in the radial direction in the rotary union shaft 130. In some embodiments, this thermal gradient may be greater than 100° C., such as between 110° and 150° C. However, note as well, that the distance from the shaft heater 131 in the axial or vertical direction also affects the temperature of the rotary union shaft 130. Thus, the lower part of the rotary union shaft 130, which is spatially distant from the shaft heater 131, is at a temperature that is between the temperature at the inner surface and the temperature of the shaft heater 131.

Turning next to the rotary union housing 220, the base 221 is cold, such as between −175° C. and −155° C., due to its contact with the cryogenic fluid. Meanwhile, the top portion 222 of the rotary union housing 220 is relatively warm, such as greater than −25° C., due to the presence of the housing heater 230. The top portion 222 and the center portion 223 have relatively thick cross-sectional areas, allowing high thermal conductivity between these two portions. Consequently, the housing heater 230 also serves to warm the center portion 223.

Therefore, the area of the rotary union housing 220 that contacts the one or more lip seals 250 is warmed by the housing heater 230, while the area of the rotary union shaft 130 that contacts the one or more lip seals 250 is warmed by shaft heater 131. Additionally, the low thermal conductivity pathway in the lower portion 224 serves to reduce the flow of heat from the center portion 223 to the base 221, allowing the center portion 223 to remain at the desired temperature. Thus, the center portion 223 may be more than 100° C. warmer than the base 221.

The system described herein has many advantages. This system provides a superior technique for dynamically sealing a cryogenic fluid from the environment for use in a rotary union. By creating thermal isolation of a lip seal from the cryogenic fluid by means of a low thermal conductivity path between the cryogenic fluid and the lip seal, the seal temperature is maintained at a sufficiently high temperature such that good seal performance is achieved. This minimizes shrinkage of the lip seals due to thermal contraction, and allows the lip seals to maintain contact with the rotary union housing and the rotary union shaft. This also results in a longer life between servicing and a much lower leak rate to the environment compared to other dynamic seal technologies.

The present disclosure is not to be limited in scope by the specific embodiments described herein. Indeed, other various embodiments of and modifications to the present disclosure, in addition to those described herein, will be apparent to those of ordinary skill in the art from t the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A rotary union for carrying a cryogenic fluid, comprising:

an inner shaft, wherein the inner shaft is configured to deliver the cryogenic fluid to a platen;

a rotary union shaft surrounding the inner shaft, having an inner surface of the rotary union shaft separated from the inner shaft by a gap configured to carry the cryogenic fluid away from the platen;

a rotary union housing surrounding the rotary union shaft;

a housing heater disposed on the rotary union housing; and one or more lip seals disposed between an outer surface of the rotary union shaft and an inner surface of a center portion of the rotary union housing; wherein the center portion of the rotary union housing is attached to a base of the rotary union housing by a lower portion, and wherein the lower portion comprises a tortuous pathway so as to increase a length of a path from the base to the center portion, wherein the tortuous pathway comprises two or more folds, wherein each fold reverses a direction of the tortuous pathway.

2. The rotary union of claim 1, further comprising a shaft heater disposed on an outer surface of the rotary union shaft.

3. The rotary union of claim 1, wherein the lower portion of the rotary union housing comprises a low thermal conductivity pathway having a thermal resistance of 10° K/Watt or greater.

4. The rotary union of claim 1, wherein the rotary union housing comprises an upper portion, the center portion and the lower portion and wherein the housing heater is disposed on the upper portion of the rotary union housing.

5. The rotary union of claim 1, wherein a thermal conductivity of a pathway from the housing heater to the center portion is at least 5 times greater than a thermal conductivity of the tortuous pathway.

6. The rotary union of claim 1, wherein channels are formed in the rotary union shaft, such that the outer surface of the rotary union shaft where the one or more lip seals are disposed is warmer than a temperature of the inner surface of the rotary union shaft.

7. The rotary union of claim 6, wherein the outer surface of the rotary union shaft is at least 100° C. warmer than the temperature of the inner surface.

8. The rotary union of claim 1, wherein an inlet and an outlet for the cryogenic fluid are disposed in the base of the rotary union housing.

9. A workpiece processing system comprising:
a process chamber housing a platen; and
the rotary union of claim 1, coupled to the platen.

10. A rotary union for carrying a cryogenic fluid, comprising:
an inner shaft, wherein the inner shaft is configured to deliver the cryogenic fluid to a platen;
a rotary union shaft surrounding the inner shaft, an inner surface of the rotary union shaft separated from the inner shaft by a gap configured to carry the cryogenic fluid away from the platen;
a rotary union housing surrounding the rotary union shaft, the rotary union housing comprising an upper portion, a center portion, a lower portion and a base;
a housing heater disposed on an outer surface of the upper portion of the rotary union housing; and
one or more lip seals disposed between the outer surface of the rotary union shaft and an inner surface of the center portion of the rotary union housing;
wherein an inlet and an outlet for the cryogenic fluid is disposed in the base; and a ratio of a thermal conductivity of a path from the housing heater to the center portion of the rotary union housing to a thermal conductivity of a path from the base to the center portion of the rotary union housing is at least 5, wherein the lower portion of the rotary union housing comprises a tortuous pathway so as to increase a length of the path from the base to the center portion and wherein the tortuous pathway comprises two or more folds, wherein each fold reverses a direction of the tortuous pathway.

11. The rotary union of claim 10, wherein the ratio is at least 10.

12. The rotary union of claim 10, wherein the outer surface of the rotary union shaft where the one or more lip seals are disposed is at least 100° C. warmer than a temperature of the base.

13. Rotary union of claim 10, further comprising a shaft heater disposed on an outer surface of the rotary union shaft.

14. The rotary union of claim 13, wherein channels are formed in the rotary union shaft, such that the outer surface of the rotary union shaft where the one or more lip seals are disposed is warmer than a temperature of the inner surface of the rotary union shaft.

15. A workpiece processing system comprising:
a process chamber housing a platen; and
a rotary union coupled to the platen, the rotary union comprising:
an inner shaft, wherein the inner shaft is configured to deliver the cryogenic fluid to a platen;
a rotary union shaft surrounding the inner shaft, an inner surface of the rotary union shaft separated from the inner shaft by a gap configured to carry the cryogenic fluid away from the platen;
a rotary union housing surrounding the rotary union shaft, the rotary union housing comprising an upper portion, a center portion, a lower portion and a base;
a housing heater disposed on an outer surface of the upper portion of the rotary union housing; and
one or more lip seals disposed between the outer surface of the rotary union shaft and an inner surface of the center portion of the rotary union housing;
wherein an inlet and an outlet for the cryogenic fluid is disposed in the base;
wherein the center portion of the rotary union housing is attached to the base of the rotary union housing by the lower portion; and
wherein the lower portion comprises a tortuous pathway so as to increase a length of a path from the base to the center portion, wherein the tortuous pathway comprises two or more folds, wherein each fold reverses a direction of the tortuous pathway.

16. The workpiece processing system of claim 15, further comprising a shaft heater disposed on an outer surface of the rotary union shaft.

17. The workpiece processing system of claim 16, wherein channels are formed in the rotary union shaft, such that the outer surface of the rotary union shaft where the one or more lip seals are disposed is warmer than a temperature of the inner surface of the rotary union shaft.

* * * * *